United States Patent [19]

Mochida et al.

[11] 4,245,713
[45] Jan. 20, 1981

[54] CARBURETOR CONTROL SYSTEM FOR MOTOR VEHICLE INCLUDING APPARATUS TO MAINTAIN THE VEHICLE IN RUNNING AT SOME DESIRED SPEED

[75] Inventors: Haruo Mochida, Yokohama; Toyohiko Morikawa, Takarazuka, both of Japan

[73] Assignee: Nissan Motor Company, Limited, Yokohama, Japan

[21] Appl. No.: 939,484

[22] Filed: Sep. 5, 1978

[30] Foreign Application Priority Data

Sep. 22, 1977 [JP] Japan .......................... 52/128620[U]

[51] Int. Cl.³ ............................................. B60K 31/00
[52] U.S. Cl. .................................. 180/176; 74/501 R; 123/398
[58] Field of Search ............... 180/175, 176, 177, 178, 180/179; 254/198; 74/501 R, 501 P; 123/103 C, 103 S, 108, 102, 103 D

[56] References Cited

U.S. PATENT DOCUMENTS

| | | | |
|---|---|---|---|
| 2,710,547 | 6/1955 | Davenport | 74/501 R |
| 3,059,715 | 10/1962 | Lopez | 180/175 |
| 3,305,042 | 2/1967 | Thorner | 180/175 |
| 3,492,031 | 1/1970 | Henning | 74/501 R |
| 3,528,523 | 9/1970 | Thorner | 180/175 |

*Primary Examiner*—David M. Mitchell

[57] ABSTRACT

In order to prevent the slack of a core of an accelerator wire which otherwise may occur during the operation of an apparatus to maintain the vehicle in running at some desired speed, a guide is arranged along a portion of the core between an end of an outer casing of the accelerator wire from which the core extends outwardly and a member, fixed to a carburetor torsion shaft, at which the core is anchored.

4 Claims, 10 Drawing Figures

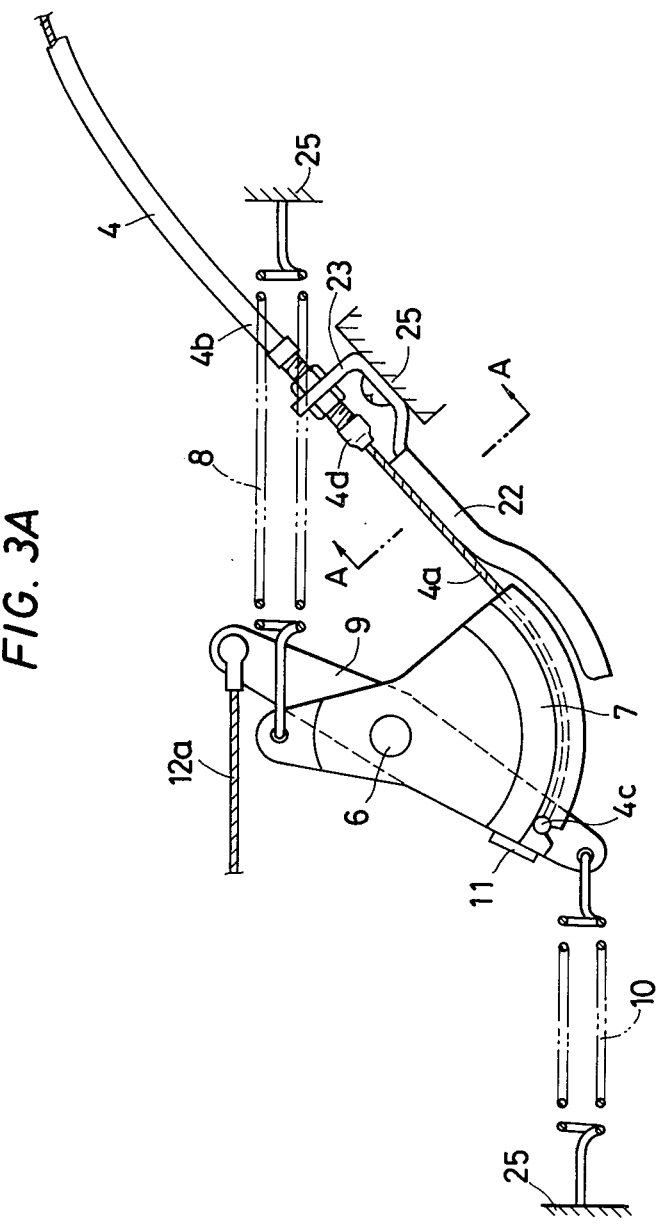
FIG. 3A
FIG. 3B

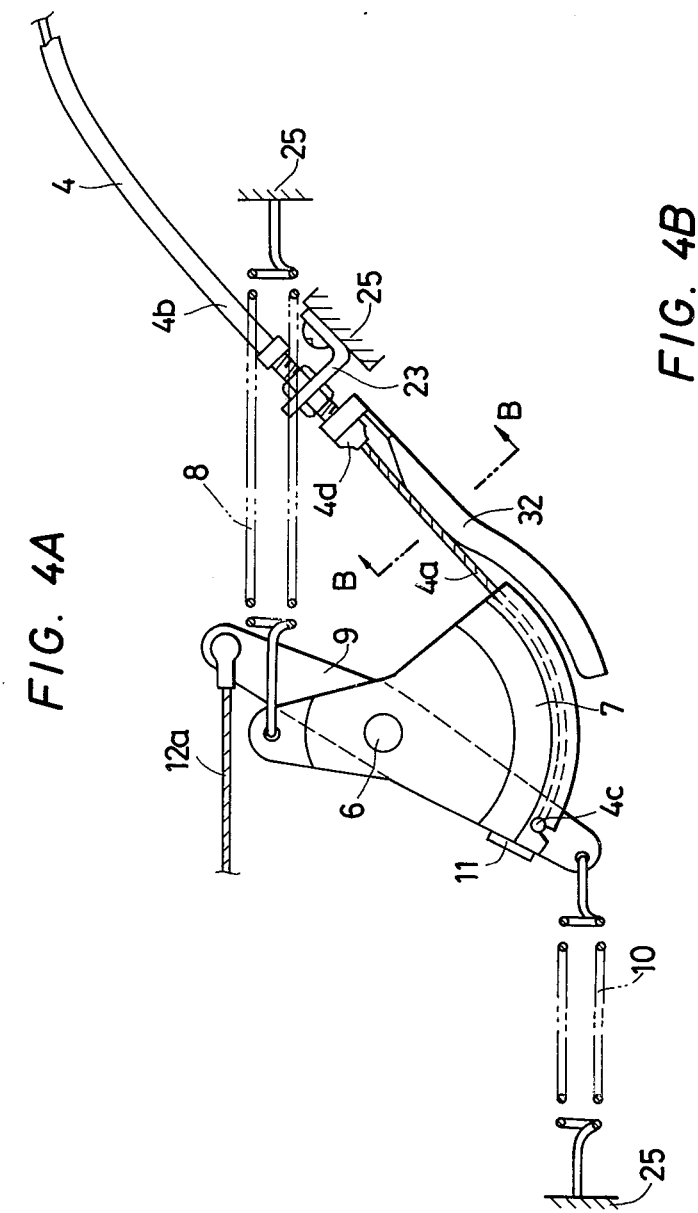

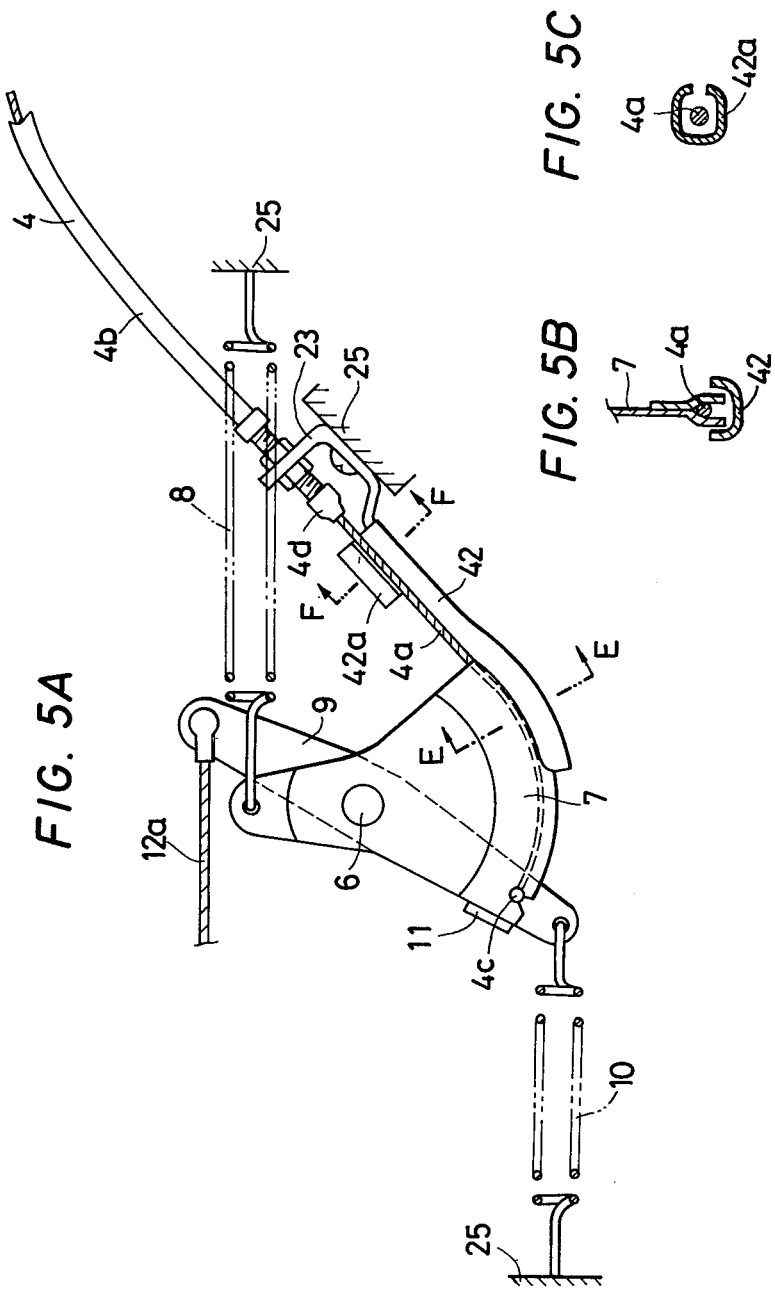

CARBURETOR CONTROL SYSTEM FOR MOTOR VEHICLE INCLUDING APPARATUS TO MAINTAIN THE VEHICLE IN RUNNING AT SOME DESIRED SPEED

BACKGROUND OF THE INVENTION

The present invention relates to a carburetor control system for a motor vehicle including an apparatus to maintain the vehicle in running at some desired speed and more particularly to an arrangement to prevent the slack of a core of a pulling type accelerator wire which transmits motion of an accelerator to the vehicle carburetor.

FIGS. 1, 2A and 2B illustrate a carburetor control system including an apparatus to maintain the vehicle in running at some desired speed, which apparatus aims at lessening the fatigue of a driver by releasing him or her from stepping on an accelerator to maintain the vehicle speed.

Referring to FIG. 1, an accelerator pedal 1 is in an operative engagement with one end of a pedal lever 3 whose opposite end is connected to one end of a core 4a of an accelerator wire 4, the lever 3 being rockably mounted to a bracket 2, fixed to a vehicle body (not shown), at its intermediate portion. Referring also to FIGS. 2A and 2B, the opposite end of the core 4a is provided with an anchor 4c with which the opposite end thereof is anchored to a fan-shaped member 7 at a portion adjacent the remote one of side edges thereof. The member 7 is connected at a root portion thereof to a torsion shaft 6 for rotation therewith, the torsion shaft 6 being connected to a throttle blade of a carburetor, not shown, for controlling an angular throttle position of the throttle blade. As best seen in FIG. 2B, the core 4a passes along the circular periphery of the fan-shaped member 7. With a return spring 8, the fan-shaped member 7 is biased in a direction indicated by an arrow b, the return spring 8 having one end engaging the fan-shaped member 7 and an opposite end engaging a fixed portion of a vehicle body 25. An idler lever 9 is rockably mounted to the torsion shaft 6 and biased in a direction indicated by an arrow c by means of a tension spring 10 having one end engaging an end of the idler lever 9 and an opposite end engaging the adjacent fixed portion of the vehicle body 25. The idler lever 9 is formed with an engaging ear portion 11 projecting laterally from an intermediate portion thereof for abutting engagement with the remote one of the side edges of the fan-shaped member 7 so that rocking the idler lever 9 in the opposite direction to the one directed by the arrow c will urge the fan-shaped member 7 to rock in the opposite direction to the one directed by the arrow b. Since the spring 8 biases the fan-shaped member 7 into engagement with the ear 11, the fan-shaped member 7 will swing together with the idler lever 9 as the latter is swung by a core 12a of a wire 12 leading to an apparatus to maintain the vehicle in running at a desired speed. One end of the core 12a engages the idler lever 9 at the opposite end thereof to the end engaged by the spring 10, while, the opposite end of the core 12a engages one end of a rod 13b whose opposite end is securely fixed to a diaphragm 13a of a diaphragm device 13. Designated by the reference numeral 16 is a so-called three-way solenoid valve, i.e., a solenoid actuated selector valve which selectively establishes an air flow communication between a vacuum pipe 14 leading to a source of vacuum, such as, the engine intake manifold, and a pipe 24 leading to a power chamber 13c of the diaphragm device or an air flow communication between a bleed pipe 15 leading to the ambient atmosphere and the pipe 24. The solenoid valve 16 has a solenoid, not shown, selectively energized under the control of a controller 17. Designated by the reference numerals 18 and 19 are a vehicle speed sensor and a switch operable by a driver. When the driver turns on the switch 19, the controller memorizes a vehicle speed at this instance so as to supply a control signal to the solenoid of the solenoid valve 16 by comparing the vehicle speed memorized with an actual vehicle speed subsequently detected by the vehicle speed sensor 18. In response to this control signal from the controller 17, the solenoid selector 16 controls the lever of vacuum within the power chamber 13c by selectively establishing an air flow communication between the pipes 14 and 24 and an air flow communication between the pipes 15 and 24. Since a diaphragm return spring 13d biases the diaphragm 13a and thus the rod 13b to the left so as to permit the spring 10 to biases the idler lever 9 into the illustrated position when the vacuum within the power chamber 13c is lower than a predetermined level, increasing the vacuum within the power chamber 13c above the predetermined level will cause the diaphragm 13a and thus the rod 13b to the left against the bias action of the spring 13d, pulling the wire 12 to rotate the idler lever 9 and thus the fan-shaped member 7, clockwise, to increase an opening degree of the throttle blade. Thus, the angular position of the throttle blade is appropriately controlled to maintain the vehicle speed at the vehicle speed value memorized by the controller 17 at the instance the switch 19 was turned on without manipulating the accelerator pedal 1. When the turned-on state ceases upon turning off of the switch 19, the above mentioned action is cancelled and the solenoid valve 16 returns to an initial or rest condition in which the bleed pipe 15 and the pipe 24 are connected, thus permitting the diaphragm return spring 13d to move the rod 13b to the illustrated position, returning the idler lever 9 to the illustrated position. The cancellation will be effected also by a brake actuation detector switch 20 when the vehicle brake is stepped on, or by an accelerator actuation detector switch 21 when the vehicle clutch is actuated.

Under a condition in which the apparatus is in operation to maintain the vehicle speed at a desired level, when the vehicle begins to climb a steep slope after running on a flat roadway or when, under a cruising condition at some vehicle speed level, the apparatus is rendered operative right after the driver steps off the accelerator 1, the idler lever 9 will be rotated counterclockwise suddenly toward a position corresponding to the fully open position of the throttle blade, thus rotating the fan-shaped member 7 accordingly.

During this motion of the fan-shaped member 7 which will push the core 4a toward a switch stop 4d at one end of an outer casing 4b of the accelerator wire 4, the accelerator, under its weight, will move toward a fully depressed position thereof, pulling the core 4a of the wire 4. However, when this motion of the fan-shaped member 7 is fast, the movement of the accelerator can not pull the core as fast as the core is pushed by the fan-shaped member 7, thus causing the core 4a to slack between the fan-shaped member 7 and the switch stop 4d, as illustrated in dash-dot-line in FIG. 1. This slack causes the core 4a to disengage from the fan-shaped member 7 or causes the core to be bent, shortening its life.

In order to prevent the occurrence of the slack as mentioned above, the weight of the accelerator 1 may be increased. But this necessitates a corresponding increase in biasing force of the throttle return spring 8, resulting in deterioration of the accelerator manipulation feeling. The occurrence of the slack may be prevented by employing, as an accelerator wire, a push and pull type cable. But this cable is so rigid against the bending stress that it reduces the transmission efficiency of the motion between the accelerator 1 and the fan-shaped member 7 and not suitable for the accelerator wire.

SUMMARY OF THE INVENTION

It is therefore an object of the present invention to prevent the occurrence of slack of a core of an accelerator wire between a fan-shaped member and a switch stop without deteriorating the manipulation feel of an accelerator or reducing the transmission efficiency of the motion by the accelerator wire.

According to the present invention, to achieve the above object, a pull type cable is used as the accelerator wire and a guide is arranged along the core of the accelerator wire to prevent the core to slack between the fan-shaped member and the switch stop.

DESCRIPTION OF THE ACCOMPANYING DRAWINGS

In the accompanying drawings:

FIG. 3A is a similar view to FIG. 2A, illustrating a first preferred embodiment of the invention;

FIG. 3B is a sectional view taken through the line A—A of FIG. 3A;

FIG. 4A is a similar view to FIG. 3A, illustrating a second preferred embodiment of the invention;

FIG. 4B is a sectional view taken through the line B—B of FIG. 4A;

FIG. 5A is a similar view to FIG. 4A, illustrating a third preferred embodiment of the invention;

FIG. 5B is a sectional view taken through the line E—E of FIG. 5A; and

FIG. 5C is a sectional view taken through the line F—F of FIG. 5A.

DESCRIPTION OF THE PREFERRED EMBODIMENTS

Figure 1:
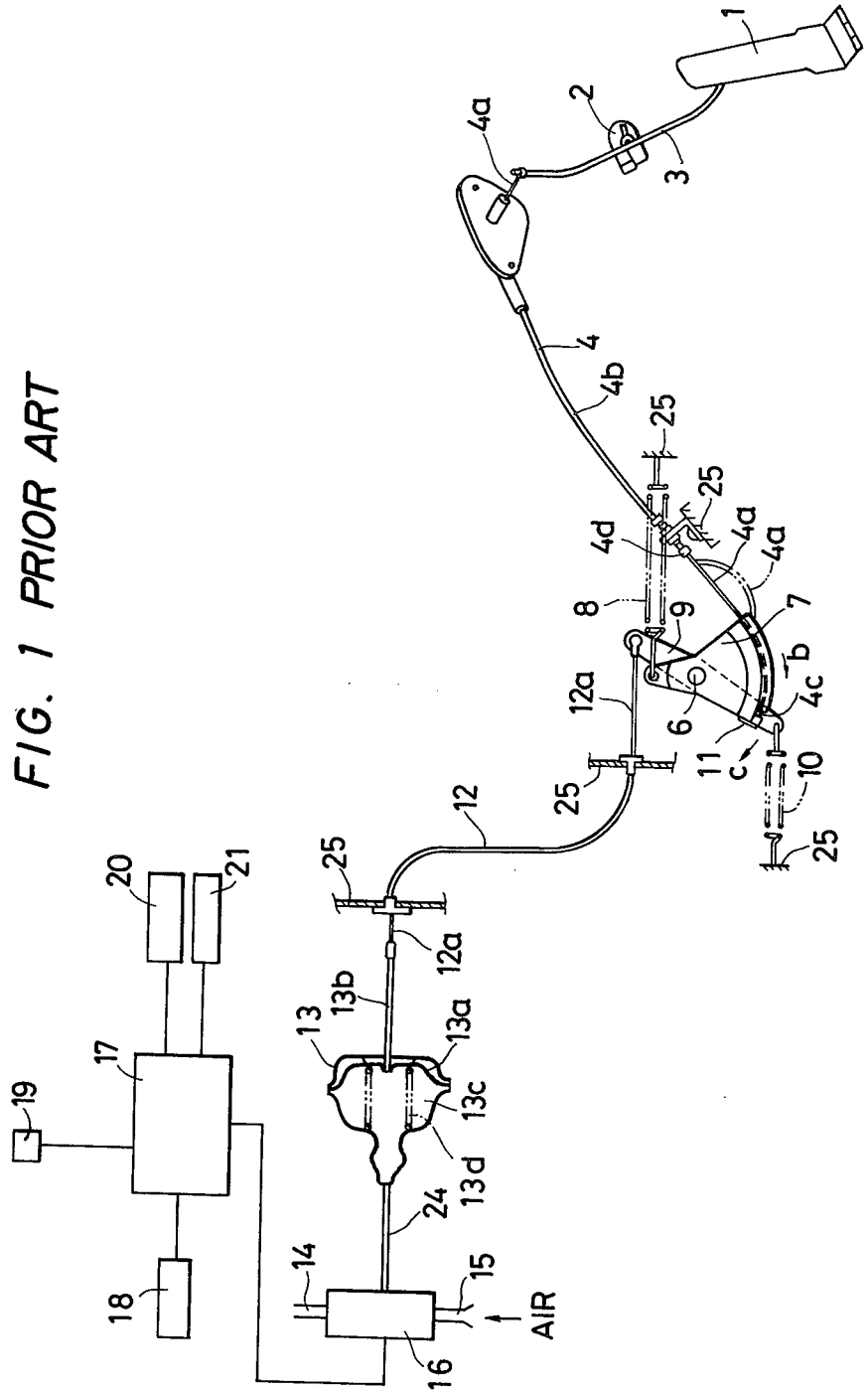
FIG. 1 is a diagrammatic view illustrating an accelerator system for a motor vehicle including an apparatus for maintaining the vehicle in running at some speed.
Figure 2A:
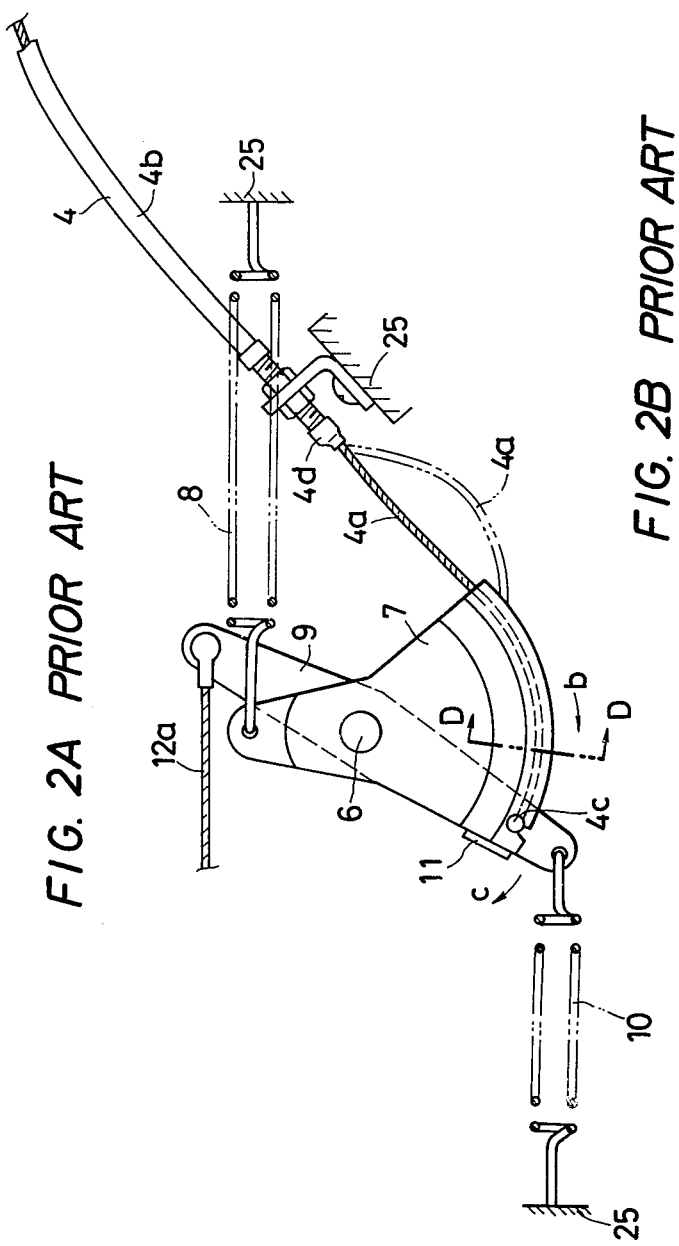
FIG. 2A is an enlarged fragmentary view of FIG. 1.
Figure 2B:
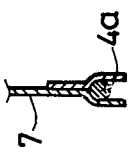
FIG. 2B is a sectional view taken through the line D—D of FIG. 2A.

Referring to the accompanying drawings, FIGS. 3A and 3B illustrate the first preferred embodiment of the invention, in which the same reference numerals used in FIGS. 1, 2A and 2B are used to designate similar parts.

As shown in FIG. 3A, a guide 22 is arranged to extend along a core 4a of an accelerator wire 4 between a switch stop 4d and a fan-shaped member 7. The guide 22 is formed integrally with a wire bracket 23 fixedly carrying one end portion of the accelerator wire 4 to a fixed portion of a vehicle body 25. Preferably, as best shown in FIG. 3B, the guide has a concave cross section.

FIGS. 4A and 4B illustrate the second preferred embodiment in which a guide 32 is integrally formed with a switch stop 4d of the accelerator wire 4.

FIGS. 5A, 5B and 5C illustrate the third preferred embodiment in which a guide 42 is formed integrally with a bracket 23 and has an annular or cylindrical portion 42a permitting a core 4a of an accelerator wire 4 to extend therethrough. As best shown in FIG. 5B, the guide 42 extends below and adjacent a fan-shaped member 7 in such a manner to prevent the core 4a received by the fan-shaped member 7 from disengaging from the fan-shaped member 7.

The arrangement, as described, including a guide 22 or 32 or 42 facilitates the entry of core 4a into the outer casing of the wire 4, thus preventing the core 4a from being bent. As a result the durability of the accelerator wire 4 extends and the removal of the core 4a from the fan-shaped member 7 is prevented.

What is claimed is:

1. A carburetor control system for a motor vehicle including an apparatus to maintain the vehicle in running at some desired speed, the carburetor control system comprising:

a torsion shaft for controlling an angular position of a throttle blade of a carburetor;

a member, fixedly mounted to said torsion shaft;

a throttle return spring for biasing said member in one rotational direction;

an accelerator;

an accelerator wire including an outer casing and a core extending through said outer casing, said outer casing having, at an end adjacent to said member, a switch stop spaced from said member and fixed to a fixed portion of the vehicle body by a bracket, said core having one end engaging said member and an opposite end operatively connected to said accelerator and arranged to transmit motion of said accelerator to said member against said throttle return spring; and means for holding said member at various angular positions thereof against the bias of said throttle return spring independently of the position of said accelerator in accordance with various running conditions of the vehicle;

in which a stationary guide is arranged along the core of said accelerator wire which extends between said member and said switch stop.

2. A carburetor control system for a motor vehicle including an apparatus to maintain the vehicle in running at some desired speed, the carburetor control system comprising:

a torsion shaft for controlling an angular position of a throttle blade of a carburetor;

a member fixedly mounted to said torsion shaft;

a throttle return spring for biasing said member in one rotational direction;

an accelerator;

an accelerator wire including an outer casing and a core extending through said outer casing, said outer casing having, at an end adjacent to said member, a switch stop spaced from said member and fixed to a fixed portion of the vehicle body by a bracket, said core having one end engaging said member and an opposite end operatively connected to said accelerator and arranged to transmit motion of said accelerator to said member against said throttle return spring; and means for holding said member at various angular positions thereof against the bias of said throttle return spring independently of the position of said accelerator in accordance with various running conditions of the vehicle;

in which a guide is arranged along the core of said accelerator wire which extends between said member and said switch and in which said guide is formed integrally with said bracket.

3. A carburetor control system as claimed in claim 1, in which said guide is formed integrally with said switch stop.

4. A carburetor control system as claimed in claim 2 or 3, in which said guide has a cylindrical portion adjacent said outer casing through which said core extends.

* * * * *

UNITED STATES PATENT AND TRADEMARK OFFICE
CERTIFICATE OF CORRECTION

PATENT NO. : 4,245,713
DATED : January 20, 1981
INVENTOR(S) : HARUO MOCHIDA ET AL It is certified that error appears in the above-identified patent and that said Letters Patent are hereby corrected as shown below:

On the title page, Item [73] should read:

--- Nissan Motor Company, Limited and Nippon Cable System Inc.---.

Signed and Sealed this

Fourth Day of May 1982

[SEAL]

Attest:

GERALD J. MOSSINGHOFF

*Attesting Officer*     *Commissioner of Patents and Trademarks*